United States Patent
Kim et al.

(10) Patent No.: US 8,003,263 B2
(45) Date of Patent: Aug. 23, 2011

(54) RECHARGEABLE LITHIUM BATTERY USING SEPARATOR PARTIALLY COATED WITH GEL POLYMER

(75) Inventors: Jee Ho Kim, Daejeon (KR); Ji Sang Yu, Daejeon (KR); Jeong Hee Choi, Busan (KR)

(73) Assignee: LG Chem, Ltd. (KR)

( * ) Notice: Subject to any disclaimer, the term of this patent is extended or adjusted under 35 U.S.C. 154(b) by 1167 days.

(21) Appl. No.: 10/557,511

(22) PCT Filed: May 28, 2004

(86) PCT No.: PCT/KR2004/001257
§ 371 (c)(1),
(2), (4) Date: Nov. 21, 2005

(87) PCT Pub. No.: WO2004/107479
PCT Pub. Date: Dec. 9, 2004

(65) Prior Publication Data
US 2007/0054183 A1    Mar. 8, 2007

(30) Foreign Application Priority Data

May 30, 2003  (KR) .................. 10-2003-0034658

(51) Int. Cl.
*H01M 6/04* (2006.01)
*H01M 6/14* (2006.01)
(52) U.S. Cl. .................. 429/303; 429/300; 429/188
(58) Field of Classification Search .................. 429/300, 429/188, 303
See application file for complete search history.

(56) References Cited

U.S. PATENT DOCUMENTS

| 5,853,914 | A | * | 12/1998 | Kawakami | ............ 429/66 |
| 6,488,721 | B1 | | 12/2002 | Carlson | ............ 29/623.5 |
| 2002/0001753 | A1 | | 1/2002 | Pekala et al. | |
| 2002/0061449 | A1 | * | 5/2002 | Maruo et al. | ............ 429/303 |
| 2002/0187401 | A1 | * | 12/2002 | Lee et al. | ............ 429/303 |
| 2003/0008206 | A1 | | 1/2003 | Hong | |

FOREIGN PATENT DOCUMENTS

| CN | 1259773 | | 7/2000 |
| EP | 0982790 | A1 | 3/2000 |
| JP | 10-289732 | * | 10/1998 |
| JP | 11-260341 | | 9/1999 |
| JP | 2000306569 | | 11/2000 |
| JP | 2002240215 | | 8/2002 |

(Continued)

OTHER PUBLICATIONS

European Search Report issued in the corresponding European Patent Application No. 04 773 830.7 on Mar. 20, 2009 (claiming priority from Korean Patent Application No. 10-2003-0034685).

(Continued)

*Primary Examiner* — Helen O Conley
(74) *Attorney, Agent, or Firm* — Cantor Colburn LLP (57) ABSTRACT

Disclosed are a separator for a battery, which is coated with a gel polymer over 40-60% of total separator area, and a rechargeable lithium battery using the separator. The separator partially coated with a gel polymer reduces the battery resistance so that the battery power can be improved. Additionally, the separator increases electrolyte impregnation rate and provides uniform electrolyte impregnation, thereby improving the life, capacity and high-rate discharge property of a battery. Further, the separator permits electrode reactions to be performed uniformly, thereby preventing lithium precipitation and improving the battery safety.

3 Claims, 5 Drawing Sheets r: 0.2mm, d: 0.5mm

FOREIGN PATENT DOCUMENTS

| | | |
|---|---|---|
| JP | 2002-373636 | 12/2002 |
| JP | 2002355938 | 12/2002 |
| JP | 2003-92146 | 3/2003 |
| JP | 2003-142158 | 5/2003 |
| JP | 2003-142159 | 5/2003 |
| KR | 1020040042749 A | 5/2004 |
| WO | 03012896 A1 | 2/2003 |

OTHER PUBLICATIONS

Chinese Office Action dated Jun. 29, 2007 for Application No. 200480015062.4.

PCT International Search Report; International Application No. PCT/KR2004/001257; International Filing date: May 28, 2004.

* cited by examiner

RECHARGEABLE LITHIUM BATTERY USING SEPARATOR PARTIALLY COATED WITH GEL POLYMER

TECHNICAL FIELD

The present invention relates to a separator partially coated with a gel polymer, and an electrode assembly and rechargeable lithium battery comprising the same.

BACKGROUND ART

Recently, there has been an explosive increase in the demand for portable electric and electronic apparatuses. As a result, rechargeable batteries are also increasingly in demand. Particularly, rechargeable lithium batteries are those of primary interest. Additionally, as portable electric and electronic apparatuses become smaller and more multi-functionalized, it is required that batteries used therein have a high performance, a compact size and various shapes. More particularly, in a notebook PC, the size of a battery greatly affects the thickness of a notebook PC. Therefore, many attempts have been made in order to reduce the thickness of a battery as well as to provide a battery having a high capacity and a high performance. Further, since environmental problems have been raised as some of the most serious problems in the world, solutions for the global warming phenomenon have been discussed sincerely and continuously.

As a solution for such environmental problems, a bill has been discussed in many countries to reduce the use of fossil fuels for automobiles, which is a primary cause for global warming, and to enforce obligatory use of environmental-friendly electric cars. A part of the bill will become effective hereafter. Additionally, in order to solve some environmental pollution problems, research and development into electric cars (HEV, EV) are continuously being made, and some kinds of electric cars have come into general usage. Therefore, a battery having a high capacity and excellent high-rate discharge property is in demand, and a novel approach to improve the thermal stability of such a battery is also in demand. In order to satisfy such demands, there has been an attempt to increase the width and the height of batteries for use in cars.

Figure 1:
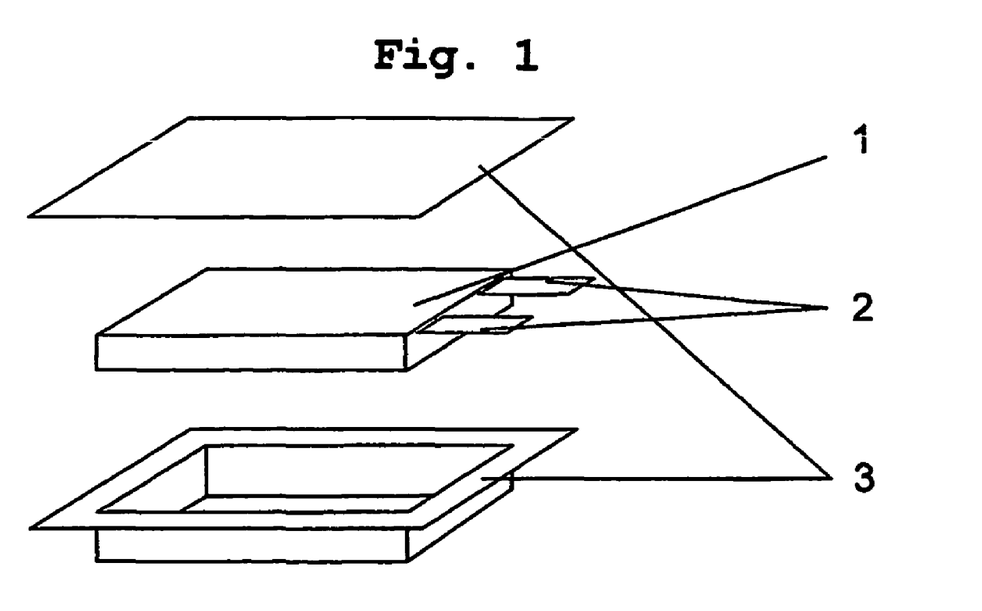
FIG. 1 is a schematic view illustrating a stacked structure of a conventional rechargeable lithium battery.
Figure 2:
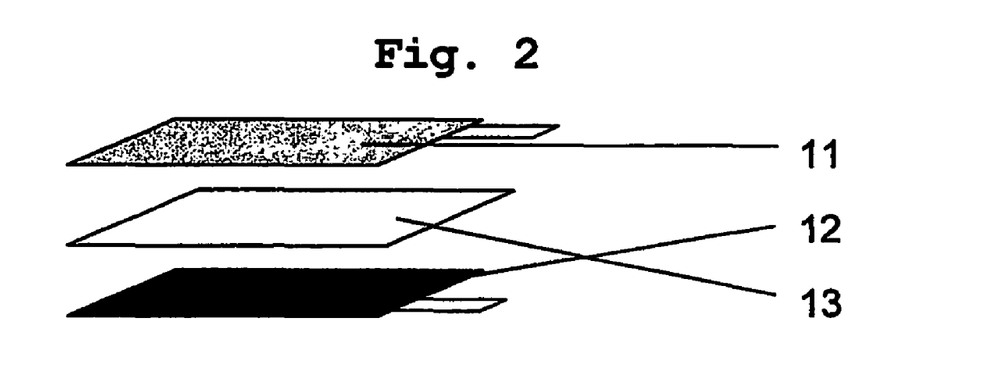
FIG. 2 is a schematic view illustrating an electrode assembly having a stacked structure according to Comparative Example 1, which comprises a conventional separator non-coated with a gel polymer.
Figure 3:
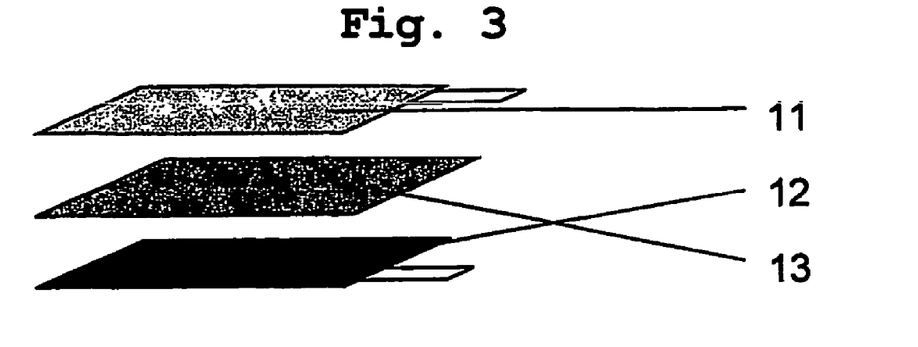
FIG. 3 is a schematic view illustrating an electrode assembly having a stacked structure according to Comparative Example 2, which comprises a separator totally coated with a gel polymer.

In general, a rechargeable lithium battery comprises an electrode assembly composed of a positive electrode comprising lithium cobalt oxide active materials, a negative electrode comprising carbon-based active materials and a separator; and an aluminum-laminated film for enclosing the electrode assembly. The structure of such a rechargeable lithium battery is shown in FIG. 1, wherein the electrode assembly has a stacked configuration as shown in FIG. 2. Particularly, the positive electrode is made by coating the positive electrode active materials on an aluminum foil, and the negative electrode is made by coating the negative electrode active materials on a copper foil. Due to the structural characteristic of batteries, a battery having a large surface area has advantages in that it permits an increased capacity and a simplified battery shape. However, when the electrodes and the separator are simply stacked, in the case of an electrode having a large surface area, it is difficult to obtain close and uniform contact between each electrode and the separator. Also, it is difficult to wet the whole surface area of the electrode with an electrolyte and to perform homogeneous electrode reactions over the whole surface area of the electrode during charge/discharge cycles. Accordingly, it is very difficult to obtain uniform battery performance. In other words, even if the electrode is apparently in a good state, the electrolyte contained therein may be in a depletion state locally, thereby causing rapid deterioration of the electrode and reducing the life of the battery. Further, when such a non-uniform state of the electrode becomes serious, the electrode reactions may occur only locally, and thus there is a possibility for local precipitation of lithium metal that is responsible for the deterioration of safety.

Meanwhile, it is known in the prior art that lamination using a gel polymer can improve the close contact between an electrode and a separator. However, in this case, some features of the battery including rapid impregnation of an electrode with an electrolyte, uniform wetting of an electrode with an electrolyte and a high-rate discharge property may be deteriorated.

DISCLOSURE OF THE INVENTION

We have found that the above-mentioned problems occurring in the prior art using a gel polymer are a result of the fact that gel polymer hinders an electrode from being impregnated with an electrolyte. Accordingly, the present invention has been made to solve the problems related with electrolyte impregnation.

It is an object of the present invention to provide a rechargeable lithium battery, in which an electrode can be totally impregnated with an electrolyte in a rapid and uniform manner, while uniform and close contact between the electrode and a separator is maintained.

It is another object of the present invention to provide a rechargeable lithium battery comprising an electrode assembly having a separator, the separator being not totally coated with a gel polymer but partially coated with a gel polymer, preferably being coated with a gel polymer in a regular pattern, for the purpose of providing a path for the permeation of an electrolyte to the separator.

Additionally, we found that, in a rechargeable lithium battery having a structural characteristic as described above, a path for discharging gases generated from electrode reactions can be provided, and thus it is possible to prevent the gases from being trapped between each electrode and a separator so that an electrode assembly is maintained in a stable form. Therefore, it is possible to prevent premature deterioration of electrodes, thereby improving the battery life.

To achieve these objects and other advantages in accordance with the purpose of the invention, as embodied and broadly described herein, there is provided a separator for a rechargeable lithium battery, the separator being coated with a gel polymer over 40-60% of the total separator area.

According to another aspect of the present invention, there are provided an electrode assembly and a rechargeable lithium battery comprising the separator.

BEST MODE FOR CARRYING OUT THE INVENTION

Hereinafter, a separator for a rechargeable lithium battery, and an electrode assembly and a rechargeable lithium battery comprising the same will be explained in detail.

A separator according to the present invention is characterized in that the separator is coated with a gel polymer over 40-60% of the total separator area so as to provide a path for permeation of an electrolyte to the separator.

The separator partially coated with a gel polymer according to the present invention has a structure in which an electrode is attached to the separator by the gel polymer.

Meanwhile, because a part non-coated with a gel polymer exists in the separator, it is possible to impregnate an electrode totally with an electrolyte in a rapid and uniform manner while the resistance of a battery is reduced, thereby improving the electric power of the battery.

The gel polymer-coated area is preferably 40-60% of total separator area, because such a range is advantageous to impregnate an electrolyte and discharge gases while permitting the maintenance of a suitable adhesion strength.

If the gel-coated area is less than 40%, an electrode can be impregnated with an electrolyte rapidly, but it is not possible to maintain uniform and close contact between the electrode and the separator, thereby adversely affecting the battery life. On the other hand, if the gel polymer-coated area is greater than 60%, uniform and close contact between the electrode and the separator can be maintained, but electrolyte impregnation is carried out slowly and non-uniformly, and thus high-rate discharge property is decreased and a battery safety-related problem is caused due to lithium precipitation.

In order to impregnate an electrode totally with an electrolyte in a rapid and uniform manner while uniform and close contact between the electrode and the separator is maintained, it is preferable that a patterned gel polymer is coated on a separator so as to provide a gel polymer-coated part and a non-coated part arranged on the separator in a regular form. As long as a gel polymer-coated part and a non-coated part are arranged regularly, there is no particular limitation in pattern design.

A gel-polymer means a polymer absorbing a liquid electrolyte spontaneously and thus becoming gelled and swollen, when it is contacted with the electrolyte.

Gel polymers that may be used in the present invention include polyvinylidene fluoride (PVDF), polyethylene glycol diacrylate, polyalkylene glycol diacrylates, such as polypropylene glycol diacrylate, polyalkylene glycol dimethacrylates, such as polyethylene glycol dimethacrylate and polypropylene glycol dimethacrylate, ether polymers, carbonate polymers, acrylonitrile polymers, copolymers and crosslinked polymers consisting of at least two of them, and fluoropolymers, etc., but are not limited thereto.

The separator may be formed of polyolefin-based materials, and it is preferably a porous separator.

Methods for coating a gel polymer include dip coating, gravure coating, spray coating, spin coating, or the like.

In order to perform gel polymer coating in a patterned manner, it is preferable to utilize a gravure coating method and a spray coating method, and is more preferable to utilize gravure coating method.

A gravure coating method is widely used in printing materials, etc., and is performed in such a manner that a predetermined part of a rubber roll (mesh roll) having a desired pattern is dipped in a container including a gel polymer, and then is rotated. When the mesh roll totally covered with the gel polymer is rotated, undesired parts of the gel polymer is removed by using a blade at a position in the exterior of the container, the mesh roll being not dipped in the gel polymer at the position. By doing so, the gel polymer is remained only in the concave part of the mesh roll, while the gel polymer is removed in the convex part of the mesh roll. In this state, the mesh roll is contacted with another rubber roll having no pattern in order to transfer the gel polymer remained in the concave part to the rubber roll. The gel polymer having a desired pattern may be coated on a separator by contacting the rubber roll having the transferred pattern with the separator and rotating both of them.

In the case of a gravure coating with a gel polymer, the gel polymer may be dispersed or dissolved in an organic solvent such as acetone. After the completion of gravure coating, the organic solvent used for dispersion, such as acetone, is dried by heating.

Additionally, the gel polymer preferably has a uniform size ranged from several tens to several hundreds micrometers and a uniform distribution on the separator, and the coating thickness is preferably 1-2 micrometers. Because the above ranges are advantageous to facilitate electrolyte impregnation and gas discharge simultaneously with maintaining a suitable adhesion strength.

An electrode assembly for a rechargeable lithium battery according to the present invention is obtained by laminating a positive electrode, a negative electrode, and a separator partially coated with a gel polymer having a uniform size and a uniform distribution and thickness as described above.

A rechargeable lithium battery according to the present invention includes a square type rechargeable lithium battery, which comprises an electrode assembly having a separator partially coated with a gel polymer over 40-60% of the total separator area, positive/negative terminals, and an aluminum-laminated film.

The rechargeable lithium battery according to the present invention may be manufactured by introducing the above-mentioned electrode assembly into the aluminum-laminated film, injecting an electrolyte containing an organic solvent, covering the aluminum-laminated film, and heat-sealing the edges.

The electrolyte used in the rechargeable lithium battery according to the present invention may be a general electrolyte. It is desirable to select an electrolyte that may show its functions in a battery depending on the kinds of positive electrode active materials and negative electrode active materials. For example, the electrolyte used in the rechargeable lithium battery may include $LiPF_6$, $LiClO_4$, $LiBF_4$, $LiN(SO_2CF_3)_2$, etc., as a base electrolyte, and a mixed solvent containing a high-dielectric solvent such as ethylene carbonate (EC) or propylene carbonate (PC) and a low-viscosity solvent such as alkyl carbonates, for example, diethyl carbonate (DEC), dimethyl carbonate (DMC) and ethylmethyl carbonate (EMC) in a suitable ratio.

According to the rechargeable lithium battery comprising a separator partially coated with a patterned gel polymer over 40-60% of total separator area, a path for the permeation of an electrolyte is provided to the separator while uniform and close contact between an electrode and the separator is maintained. Therefore, the electrode is totally impregnated with the electrolyte in a rapid and uniform manner, thereby improving the battery performance. Additionally, a path for discharging gases generated from electrode reactions is provided, and thus it is possible to prevent the gases from being trapped between each electrode and the separator, and to keep an electrode assembly in a stable form. Therefore, it is possible to prevent premature deterioration of electrodes, thereby improving the battery life.

In other words, a rechargeable lithium battery using a separator according to the present invention shows an excellent degree of close contact between an electrode and a separator compared to a conventional rechargeable lithium battery using a general separator, maintains an electrolyte impregnation rate equal to that of a conventional rechargeable lithium battery, and includes an electrode impregnated with an electrolyte uniformly. Accordingly, it is possible to reduce the battery resistance and improve the battery performance. Particularly, it is possible to improve high-rate discharge property of the battery, thereby providing an excellent battery power.

Reference will now be made in detail to the preferred embodiments of the present invention. It is to be understood that the following examples are illustrative only and the present invention is not limited thereto.

Comparative Example 1

An electrode assembly comprising a positive electrode consisting of lithium cobalt oxide active materials and a negative electrode consisting of carbon-based active materials was prepared, both electrodes being separated from each other by a separator non-coated with a gel polymer (See FIG. 2). Particularly, the separator used in this example was a product commercially available as CellGuard company, which was composed of triple layers of polypropylene (PP)/polyethylene (PE)/PP and had a thickness of 20 micrometers.

Comparative Example 2

8 wt % of PVDF was dispersed in acetone to form a gel polymer solution. The gel polymer solution was introduced into a container. A separator mounted on an unwinder in the form of a roll was unwound and moved, while the separator was passed through the container including the gel polymer to coat the separator totally with the gel polymer. Then, the gel polymer totally coated on the separator was dried in a drying zone. After this, the separator was recovered in the form of a roll by a winder. The coating thickness was set to 1-2 micrometers after drying, and the same separator product as in Comparative Example 1 was used.

Accordingly, an electrode assembly comprising the same positive and negative electrodes as in Comparative Example 1 separated by the separator totally coated with a gel polymer by a dipping method was obtained.

Comparative Example 3

8 wt % of PVDF was dispersed in acetone to form a gel polymer solution. The gel polymer solution was introduced into a container. A separator mounted on an unwinder in the form of a roll was unwound and moved, while the separator was passed through a rubber roll, to which a gel polymer was transferred from another rubber roll having no pattern, to coat the separator totally with the gel polymer. Then, the gel polymer totally coated on the separator was dried in a drying zone. After this, the separator was recovered in the form of a roll by a winder. In other words, a gravure coating method was used in this example, wherein a rubber roll having no pattern, not a mesh roll, was used and a blade was not used so that the separator was totally coated with the polymer gel. The coating thickness was set to 1-2 micrometers after drying, and the same separator product as in Comparative Example 1 was used.

Accordingly, an electrode assembly comprising the same positive and negative electrodes as in Comparative Example 1 separated by a separator totally coated with a gel polymer by the above-described gravure coating method was obtained.

Example 1

Figure 4:
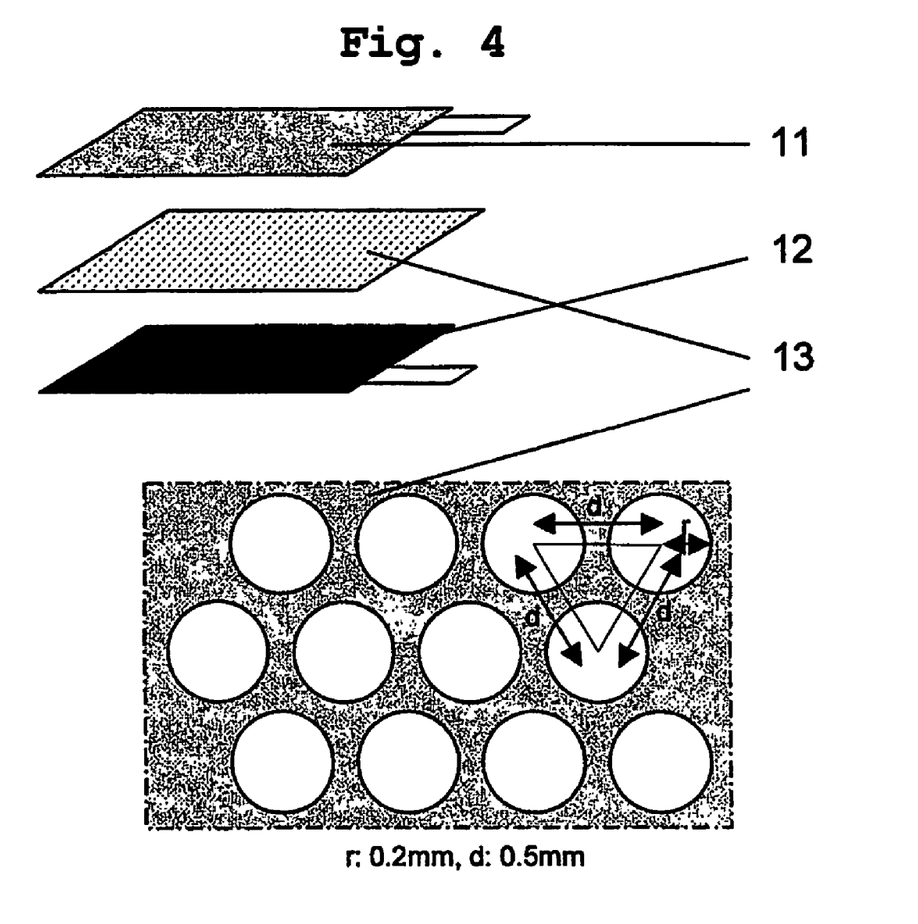
FIG. 4 is a schematic view illustrating an electrode assembly having a stacked structure according to Example 1, which comprises a separator partially coated with a gel polymer by a gravure coating method.

8 wt % of PVDF was dispersed in acetone to form a gel polymer solution. The gel polymer solution was introduced into a container. A separator mounted on an unwinder in the form of a roll was unwound and moved, while the separator was passed through a rubber roll, to which a gel polymer was transferred from a mesh roll, to coat the separator partially with the patterned gel polymer. Then, the gel polymer partially coated on the separator was dried in a drying zone. After this, the separator was recovered in the form of a roll by a winder. Particularly, the gel polymer-coated area was set to about 50% of total separator area. The pattern has a shape as illustrated in FIG. 4. Further, the coating thickness was set to 1-2 micrometers after drying, and the same separator product as in Comparative Example 1 was used.

Accordingly, an electrode assembly comprising the same positive and negative electrodes as in Comparative Example 1 separated by a separator partially coated with a gel polymer by the above-described gravure coating method was obtained.

Experimental Example 1

Each of the electrode assemblies obtained from Comparative Examples 1, 2 and 3 and Example 1 was introduced in an aluminum-laminated film 3 (See FIG. 1). To each electrode, an electrolyte composed of ethylene carbonate (EC), ethylmethyl carbonate (EMC) and a lithium salt ($LiPF_6$) was injected in an equal amount. Then, the electrode was enclosed with the aluminum-laminated film and the edges were heat-sealed to provide a battery.

The batteries obtained as described above were impregnated with an electrolyte for two hours, six hours, one day, two days and one week. After this, each of the batteries was disassembled and weighed to determine the amount of electrolyte impregnation, and then impregnation rates of the batteries were compared.

Figure 5:
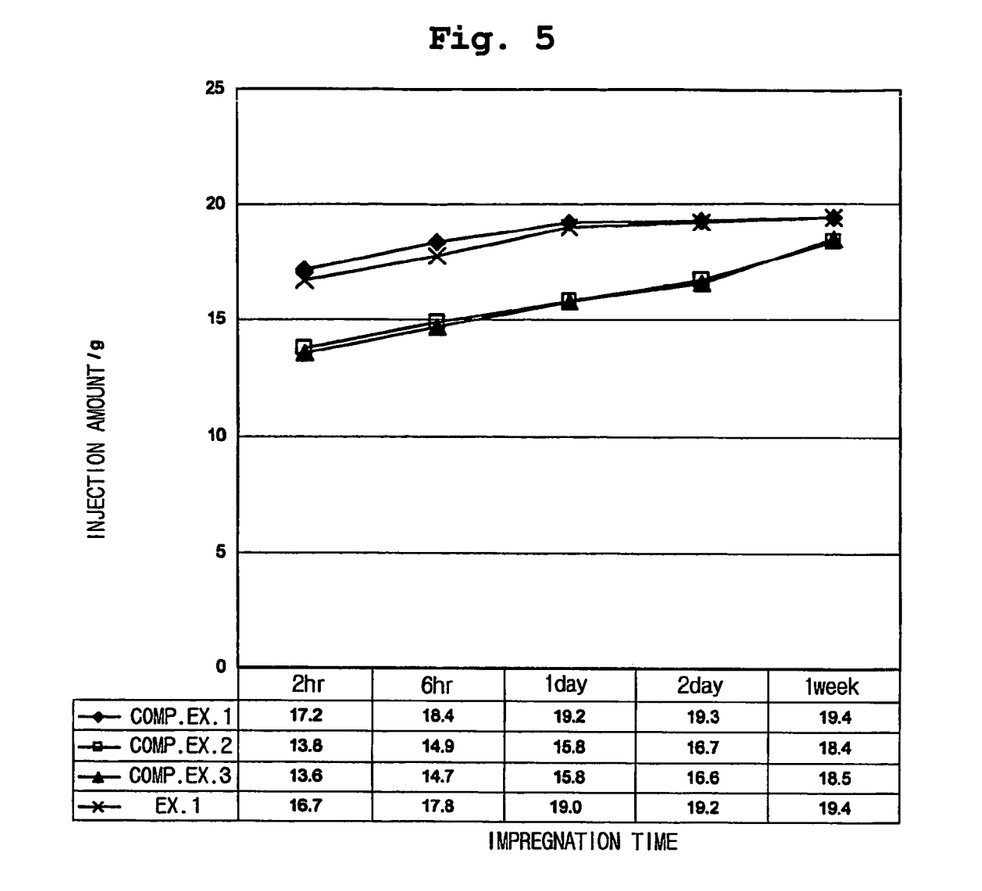
FIG. 5 is a graph showing the electrolyte impregnation rate of a battery (Comparative Examples 2 and 3 and Example 1) comprising a separator coated with a gel polymer, compared to that of a battery (Comparative Example 1) comprising a conventional separator non-coated with a gel polymer.

FIG. 5 is a graph illustrating the amount of electrolyte impregnation in each example with time. Comparative Example 1 and Example 1 showed similar results, and the amounts of electrolyte impregnation with time in Comparative Examples 2 and 3 were less than that in Comparative Example 1 and Example 1. In other words, Comparative Examples 2 and 3 provided a relatively low impregnation rate. As can be seen from FIG. 5, the initial amount of electrolyte impregnation was similar in Comparative Example 1 and Example 1, and was relatively low in Comparative Examples 2 and 3, wherein the difference between both groups was gradually reduced with time. As can be seen from the result, Comparative Example 1 and Example 1 provided an excellent impregnation rate similarly, while Comparative Examples 2 and 3 provided a similarly low impregnation rate.

Experimental Example 2

The electrode assemblies obtained from Comparative Examples 1-3 and Example 1 were used to manufacture batteries in the same manner as described in Experimental Example 1, except that the electrode assemblies were impregnated with an electrolyte for a sufficient time. The batteries were compared in terms of cycle property by repeatedly carrying out charge/discharge by using a charge/discharge tester under a charge/discharge condition of 1.0 C/1.0 C.

Figure 6:
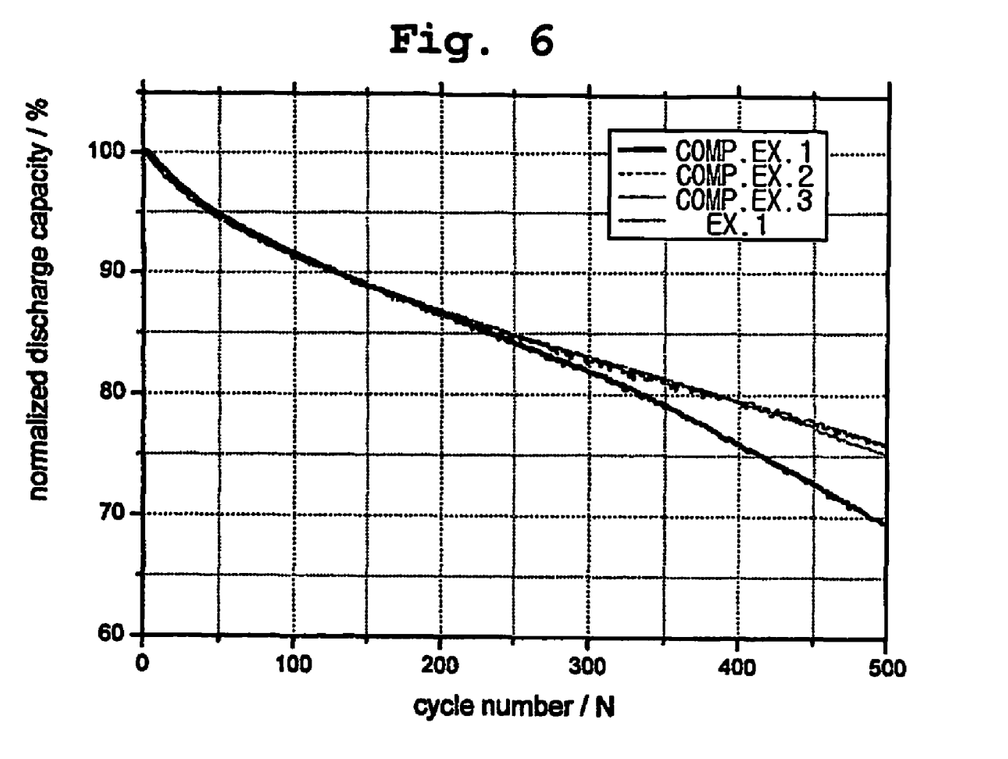
FIG. 6 is a graph showing the charge/discharge cycle property of a battery (Comparative Examples 2 and 3 and Example 1) comprising a separator coated with a gel polymer, compared to that of a battery (Comparative Example 1) comprising a conventional separator non-coated with a gel polymer.

FIG. 6 is a graph illustrating discharge cycles of Comparative Examples 1-3 and Example 1 when charge/discharge is performed under 1 C. As can be seen from FIG. 6, Comparative Examples 2 and 3 and Example 1 showed similar cycle properties, while Comparative Example 1 showed a relatively low value in proportion to increase of cycle number. It is thought that this is resulted from excellent uniform and close contact between an electrode and a separator provided by a battery comprising a gel polymer-coated separator.

Experimental Example 3

The electrode assemblies obtained from Comparative Examples 1-3 and Example 1 were used to manufacture batteries in the same manner as described in Experimental Example 1. The batteries were compared in terms of high-rate discharge property by using a charge/discharge tester. In all cases, battery charge condition was set to 1 C, and discharge was carried out under a condition of 0.5/1.0/2.0/3.0/5.0/10.0/15.0/20.0/25.0 C.

Figure 7:
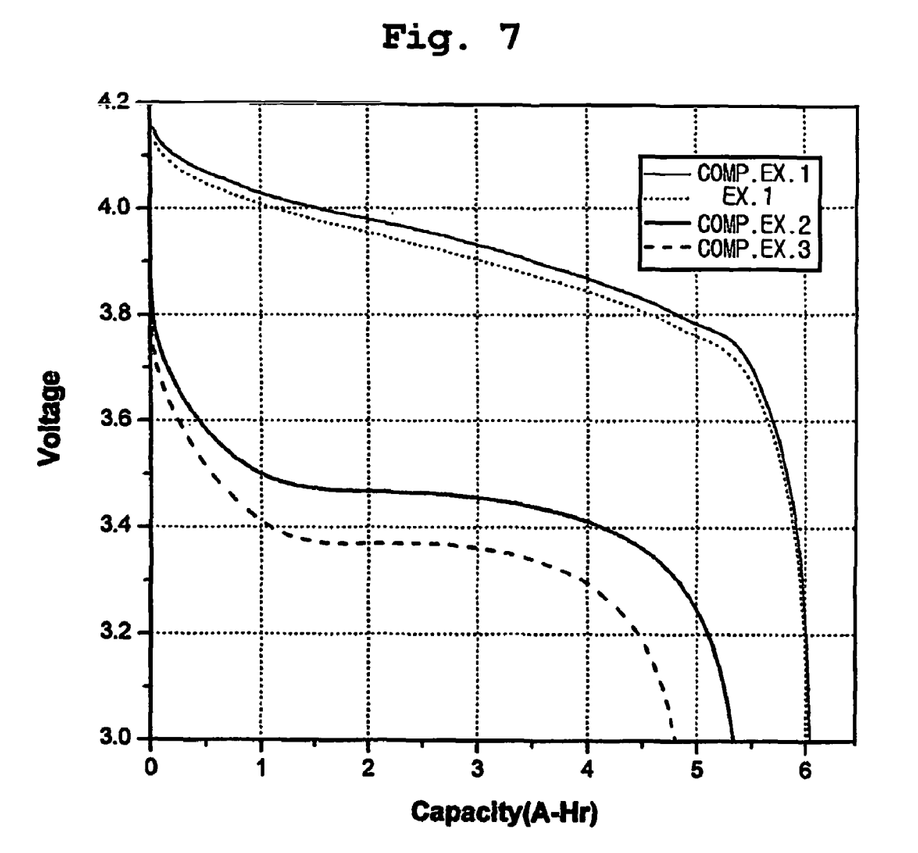
FIG. 7 is a graph showing the discharge curve behavior of a battery (Comparative Examples 2 and 3 and Example 1) comprising a separator coated with a gel polymer, compared to that of a battery (Comparative Example 1) comprising a conventional separator non-coated with a gel polymer, during high-rate discharge at 20C, wherein drawing numeral 1 represents an electrode assembly, 11 represents a positive electrode, 12 represents a negative electrode, 13 represents a separator, 2 represents positive/negative terminals, 3 represents Al laminated film.

FIG. 7 is a graph showing the discharge curve behavior of a battery (Comparative Examples 2 and 3 and Example 1) comprising a separator coated with a gel polymer, compared to that of a battery (Comparative Example 1) comprising a conventional separator non-coated with a gel polymer, during high-rate discharge at 20 C.

As can be seen from FIG. 7, the batteries obtained according to Comparative Example 1 and Example 1 showed similar results, while the batteries obtained according to Comparative Examples 2 and 3 showed a relatively low discharge capacity, i.e., about 80% based on the result obtained from Comparative Examples 1 and Example 1. Moreover, voltage drop was relatively increased in Comparative Examples 2 and 3. Accordingly, it is believed that a main factor affecting the high-rate discharge property of a battery is not how close is the contact between an electrode and a separator but whether a gel polymer is coated on the separator or not. In other words, in the case of a separator totally coated with a gel polymer (as in Comparative Examples 2 and 3), the gel polymer may be act as a resistance, thereby reducing the high-rate discharge property.

As can be seen from the results illustrated in FIGS. 6 and 7, Comparative Examples 2 and 3 and Example 1 excellent in uniform and close contact between an electrode and a separator showed excellent results in terms of a relatively low rate discharge property (at 5 C or less) and cycle property, while Comparative Example 1 and Example 1 having a relatively small amount of a gel polymer acting as a resistance showed excellent results in terms of high-rate discharge property.

In other words, when a separator is partially coated with a gel polymer, it is possible to impregnate an electrode with an electrolyte in a rapid and uniform manner and to ensure uniform and close contact between an electrode and a separator, and thus excellent cycle property of a battery can be obtained and high-rate discharge property of a battery can be improved.

INDUSTRIAL APPLICABILITY

As can be seen from the foregoing, a separator partially coated with a gel polymer for use in an electrode assembly of a rechargeable lithium battery can improve the degree of close contact between an electrode and a separator, increase an electrolyte impregnation rate, and provide a path for discharging gases generated from electrode reactions, and thus it is possible to improve the battery performance including high-rate discharge property and to prevent premature deterioration of electrodes, thereby improving the battery life. Additionally, according to the present invention, the separator has a gel polymer-coated part and a non-coated part in a regular patterned shape, and thus the electrode is uniformly impregnated with the electrolyte and the contact between the electrode and the separator are maintained uniformly, so that the electrode is totally and uniformly wetted with the electrolyte. Therefore, uniform battery performance can be obtained and the battery life can be improved. Also, electrode reactions can be performed uniformly, thereby preventing lithium precipitation and improving battery safety.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A separator for a battery, coated with a gel polymer over 40-60% of a total separator area based on a surface of the separator to be coated with the gel polymer,
   wherein the separator is partially coated with the gel polymer in which coated or non-coated areas form a pattern, the gel polymer coat has a thickness of from 1 to 2 micrometers, the gel polymer is coated on the separator by gravure coating, and
   the gel polymer is selected from the group consisting of polyvinylidene fluoride (PVDF); polyethylene glycol diacrylate; polyalkylene glycol diacrylates; polyalkylene glycol dimethacrylates; ether polymers; carbonate polymers; acrylonitrile polymers; copolymers and crosslinked polymers consisting of at least two of them; and fluoropolymers.

2. An electrode assembly for a rechargeable lithium battery, which comprises a positive electrode, a negative electrode, and a separator for a battery, wherein the separator is coated with a gel polymer over 40-60% of a total separator area based on a surface of the separator to be coated with the gel polymer,     wherein the separator is partially coated with the gel polymer in which coated or non-coated areas form a pattern, the gel polymer coat has a thickness of from 1 to 2 micrometers, the gel polymer is coated on the separator by gravure coating, and the gel polymer is selected from the group consisting of polyvinylidene fluoride (PVDF); polyethylene glycol diacrylate; polyalkylene glycol diacrylates; polyalkylene glycol dimethacrylates; ether polymers; carbonate polymers; acrylonitrile polymers; copolymers and crosslinked polymers consisting of at least two of them; and fluoropolymers.

3. A rechargeable lithium battery comprising an electrode assembly as defined in claim 2, a positive terminal, a negative terminal and an aluminum-laminated film,     wherein the separator is partially coated with a gel polymer in which coated or non-coated areas form a pattern.

\* \* \* \* \*